United States Patent
Xie (10) Patent No.: US 9,374,384 B2
(45) Date of Patent: *Jun. 21, 2016

(54) HARDWARE BASED DETECTION DEVICES FOR DETECTING NETWORK TRAFFIC CONTENT AND METHODS OF USING THE SAME

(71) Applicant: Fortinet, Inc., Sunnyvale, CA (US)

(72) Inventor: Michael Xie, Menlo Park, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,142

(22) Filed: Dec. 2, 2014

(65) Prior Publication Data

US 2015/0089649 A1   Mar. 26, 2015

Related U.S. Application Data

(63) Continuation of application No. 13/798,350, filed on Mar. 13, 2013, now Pat. No. 8,918,504, which is a continuation of application No. 10/624,914, filed on Jul. 21, 2003, now Pat. No. 8,788,650.

(60) Provisional application No. 60/397,033, filed on Jul. 19, 2002, provisional application No. 60/397,034, filed on Jul. 19, 2002, provisional application No. 60/397,147, filed on Jul. 19, 2002, provisional application No. 60/397,302, filed on Jul. 19, 2002, provisional application No. 60/397,304, filed on Jul. 19, 2002.

(51) Int. Cl.
*G06F 15/16* (2006.01)
*H04L 29/06* (2006.01)
*H04L 12/26* (2006.01)

(52) U.S. Cl.
CPC ............ *H04L 63/1416* (2013.01); *H04L 43/04* (2013.01); *H04L 43/10* (2013.01); *H04L 63/0236* (2013.01); *H04L 63/0245* (2013.01); *H04L 63/145* (2013.01); *H04L 63/1425* (2013.01); *H04L 63/1441* (2013.01)

(58) Field of Classification Search
None
See application file for complete search history.

(56) References Cited

U.S. PATENT DOCUMENTS

| | | |
|---|---|---|
| 5,440,749 A | 8/1995 | Moore et al. |
| 5,491,691 A | 2/1996 | Shtayer et al. |
| 5,530,939 A | 6/1996 | Mansfield, Jr. et al. |
| 5,539,659 A | 7/1996 | McKee et al. |
| 5,557,742 A | 9/1996 | Smaha et al. |
| 5,682,386 A * | 10/1997 | Arimilli et al. ............... 370/468 |
| 5,790,799 A | 8/1998 | Mogul |
| 5,889,943 A | 3/1999 | Ji et al. |

(Continued)

OTHER PUBLICATIONS

"U.S. Appl. No. 10/624,452, Advisory Action mailed Dec. 17, 2007", 3 pgs.

(Continued)

*Primary Examiner* — Thomas Dailey
(74) *Attorney, Agent, or Firm* — Law Office of Dorian Cartwright; Dorian Cartwright (57) ABSTRACT

A device for detecting network traffic content is provided. The device includes a first input port configured to receive one or more signatures, each of the one or more signatures associated with content desired to be detected, a second input port configured to receive data associated with network traffic content. The device also includes a processor configured to process the one or more signatures and the data to determine whether the network traffic content matches the content desired to be detected, and an output port configured to couple the device to a computer system of an intended recipient of the network traffic content. The output port passes the network traffic content to the computer system when it is determined that the network traffic content does not match the content desired to be detected.

20 Claims, 9 Drawing Sheets

(56) References Cited

U.S. PATENT DOCUMENTS

| | | | |
|---|---|---|---|
| 5,892,348 | A | 4/1999 | Norman et al. |
| 5,896,499 | A | 4/1999 | McKelvey |
| 5,946,487 | A | 8/1999 | Dangelo |
| 5,991,881 | A | 11/1999 | Conklin et al. |
| 6,009,467 | A | 12/1999 | Ratcliff et al. |
| 6,067,575 | A | 5/2000 | McManis et al. |
| 6,119,175 | A | 9/2000 | Hakkarainen et al. |
| 6,219,706 | B1* | 4/2001 | Fan et al. ............ 709/225 |
| 6,279,113 | B1 | 8/2001 | Vaidya |
| 6,338,141 | B1 | 1/2002 | Wells |
| 6,453,345 | B2 | 9/2002 | Trcka et al. |
| 6,484,315 | B1* | 11/2002 | Ziese ............ 717/173 |
| 6,487,666 | B1 | 11/2002 | Shanklin et al. |
| 6,513,122 | B1* | 1/2003 | Magdych et al. ............ 726/23 |
| 6,519,703 | B1 | 2/2003 | Joyce |
| 6,577,920 | B1 | 6/2003 | Hyppönen et al. |
| 6,637,026 | B1 | 10/2003 | Chen |
| 6,654,373 | B1 | 11/2003 | Maher et al. |
| 6,654,882 | B1 | 11/2003 | Froutan et al. |
| 6,823,697 | B2 | 11/2004 | Fukuyama et al. |
| 6,826,697 | B1* | 11/2004 | Moran ............ 726/23 |
| 6,873,988 | B2 | 3/2005 | Herrmann et al. |
| 7,043,757 | B2 | 5/2006 | Hoefelmeyer et al. |
| 7,047,288 | B2 | 5/2006 | Cooper |
| 7,080,408 | B1 | 7/2006 | Pak et al. |
| 7,134,012 | B2 | 11/2006 | Doyle et al. |
| 7,181,765 | B2 | 2/2007 | Patel et al. |
| 7,181,769 | B1 | 2/2007 | Kianini et al. |
| 7,185,368 | B2 | 2/2007 | Copeland, III |
| 7,243,371 | B1 | 7/2007 | Kasper et al. |
| 7,424,744 | B1 | 9/2008 | Wu et al. |
| 7,519,990 | B1 | 5/2011 | Xie |
| 8,140,660 | B1 | 3/2012 | Wells et al. |
| 8,239,949 | B2 | 8/2012 | Xie |
| 8,244,863 | B2 | 8/2012 | Pahrump et al. |
| 8,788,650 | B1 | 7/2014 | Xie |
| 8,789,183 | B1 | 7/2014 | Xie |
| 8,918,504 | B2 | 12/2014 | Xie |
| 9,118,705 | B2 | 8/2015 | Xie |
| 2001/0042214 | A1* | 11/2001 | Radatti et al. ............ 713/201 |
| 2002/0038339 | A1 | 3/2002 | Xu |
| 2002/0059425 | A1* | 5/2002 | Belfiore et al. ............ 709/226 |
| 2002/0073337 | A1* | 6/2002 | Ioele et al. ............ 713/201 |
| 2002/0094090 | A1 | 7/2002 | Iino |
| 2002/0129264 | A1* | 9/2002 | Rowland et al. ............ 713/200 |
| 2002/0129271 | A1 | 9/2002 | Stanaway, Jr. et al. |
| 2002/0162026 | A1 | 10/2002 | Neuman |
| 2002/0174350 | A1 | 11/2002 | Franczek |
| 2002/0188839 | A1 | 12/2002 | Noehring |
| 2003/0004689 | A1* | 1/2003 | Gupta et al. ............ 702/188 |
| 2003/0014662 | A1 | 1/2003 | Gupta et al. |
| 2003/0051162 | A1 | 3/2003 | Kirchmann |
| 2003/0061496 | A1 | 3/2003 | Ananda |
| 2003/0084319 | A1 | 5/2003 | Tarquini et al. |
| 2003/0084322 | A1* | 5/2003 | Schertz et al. ............ 713/200 |
| 2003/0084340 | A1* | 5/2003 | Schertz et al. ............ 713/201 |
| 2003/0145228 | A1 | 7/2003 | Suuronen et al. |
| 2004/0003284 | A1* | 1/2004 | Campbell et al. ............ 713/201 |
| 2005/0021613 | A1 | 1/2005 | Schmeidler et al. |
| 2005/0086499 | A1 | 4/2005 | Hoefelmeyer et al. |
| 2005/0251570 | A1* | 11/2005 | Heasman et al. ............ 709/224 |
| 2009/0168651 | A1 | 7/2009 | Xie |
| 2012/0102196 | A1 | 4/2012 | Wells et al. |
| 2013/0254382 | A1 | 9/2013 | Xie |
| 2013/0263271 | A1 | 10/2013 | Xie |

OTHER PUBLICATIONS

"U.S. Appl. No. 10/624,452, Final Office Action mailed Oct. 1, 2009", 9 pgs.

"U.S. Appl. No. 10/624,452, Final Office Action mailed Oct. 3, 2007", 18 pgs.

"U.S. Appl. No. 10/624,452, Final Office Action mailed Oct. 17, 2008", 6 pgs.

"U.S. Appl. No. 10/624,452, Final Office Office Action mailed Nov. 17, 2010", 17 pgs.

"U.S. Appl. No. 10/624,452, Non-Final Office Action mailed Mar. 4, 2009", 8 pgs.

"U.S. Appl. No. 10/624,452, Non-Final Office Action mailed Apr. 18, 2007", 13 pgs.

"U.S. Appl. No. 10/624,452, Non-Final Office Action mailed Apr. 28, 2010", 16 pgs.

"U.S. Appl. No. 10/624,452, Non-Final Office Action mailed Apr. 30, 2008", 14 pgs.

"U.S. Appl. No. 10/624,452, Notice of Allowance mailed Nov. 10, 2011", 15 pgs.

"U.S. Appl. No. 10/624,452, Preliminar Amendment mailed Apr. 26, 2005", 3 pgs.

"U.S. Appl. No. 10/624,452, Preliminary Amendment mailed Aug. 27, 2003", 3 pgs.

"U.S. Appl. No. 10/624,452, Response filed Jan. 21, 2009 to Final Office Action Mailed Oct. 17, 2008", 11 pgs.

"U.S. Appl. No. 10/624,452, Response filed Mar. 1, 2010 to Final Office Action mailed Oct. 1, 2009", 12 pgs.

"U.S. Appl. No. 10/624,452, Response filed Jun. 2, 2009 to Non Final Office Action mailed Mar. 4, 2009", 12 pgs.

"U.S. Appl. No. 10/624,452, Response filed Jul. 13, 2011 to Final Office Action mailed Nov. 17, 2010", 9 pgs.

"U.S. Appl. No. 10/624,452, Response filed Jul. 18, 2007 to Non-Final Office Action Apr. 18, 2007", 15 pgs.

"U.S. Appl. No. 10/624,452, Response filed Jul. 30, 2008 to Non-Final Office Action mailed Apr. 30, 2008", 10 pgs.

"U.S. Appl. No. 10/624,452, Response filed Aug. 30, 2010 to Non Final Office Action mailed Apr. 28, 2010", 12 pgs.

"U.S. Appl. No. 10/624,452, Response filed Dec. 3, 2007 to Final Office Action Oct. 3, 2007", 15 pgs.

"U.S. Appl. No. 10/624,914, Advisory Action mailed Oct. 19, 2007", 3 pgs.

"U.S. Appl. No. 10/624,914, Final Office Action mailed Mar. 31, 2010", 12 pgs.

"U.S. Appl. No. 10/624,914, Final Office Action mailed Jul. 10, 2008", 16 pgs.

"U.S. Appl. No. 10/624,914, Final Office Action mailed Aug. 10, 2007", 17 pgs.

"U.S. Appl. No. 10/624,914, Final Office Action mailed Aug. 18, 2011", 17 pgs.

"U.S. Appl. No. 10/624,914, Non Final Office Action mailed Mar. 3, 2011", 13 pgs.

"U.S. Appl. No. 10/624,914, Non Final Office Action mailed May 10, 2012", 14 pgs.

"U.S. Appl. No. 10/624,914, Non Final Office Action mailed Jun. 10, 2013", 13 pgs.

"U.S. Appl. No. 10/624,914, Non Final Office Action mailed Dec. 16, 2013", 11 pgs.

"U.S. Appl. No. 10/624,914, Non-Final Office Action mailed Jan. 2, 2008", 17 pgs.

"U.S. Appl. No. 10/624,914, Non-Final Office Action mailed Mar. 14, 2007", 10 pgs.

"U.S. Appl. No. 10/624,914, Non-Final Office Action mailed Jun. 24, 2009", 2 pgs.

"U.S. Appl. No. 10/624,914, Notice of Allowance mailed Apr. 21, 2014", 10 pgs.

"U.S. Appl. No. 10/624,914, Preliminary Amendment mailed Apr. 26, 2005", 5 pgs.

"U.S. Appl. No. 10/624,914, Response filed Jan. 2, 2014 to Non Final Office Action mailed Dec. 16, 2013", 8 pgs.

"U.S. Appl. No. 10/624,914, Response filed Jan. 9, 2013 to Non Final Office Action mailed May 10, 2012", 8 pgs.

"U.S. Appl. No. 10/624,914, Response filed Apr. 2, 2008 to Non-Final Office Action mailed Jan. 2, 2008", 15 pgs.

"U.S. Appl. No. 10/624,914, Response filed Jun. 3, 2011 to Non Final Office Action mailed Mar. 3, 2011", 8 pgs.

"U.S. Appl. No. 10/624,914, Response filed Jun. 14, 2007 to Non-Final Office Action mailed Mar. 14, 2007", 11 pgs.

"U.S. Appl. No. 10/624,914, Response filed Aug. 30, 2010 to Final Office Action mailed Mar. 31, 2010", 8 pgs.

(56) References Cited

OTHER PUBLICATIONS

"U.S. Appl. No. 10/624,914, Response filed Sep. 10, 2013 to Non Final Ofifce Action mailed Jun. 10, 2013", 8 pgs.
"U.S. Appl. No. 10/624,914, Response filed Sep. 24, 2007 to Final Office Action mailed Aug. 10, 2007", 12 pgs.
"U.S. Appl. No. 10/624,914, Response filed Dec. 17, 2009 to Non Final Office Action mailed Jun. 24, 2009", 7 pgs.
"U.S. Appl. No. 10/624,914, Response filed Dec. 19, 2011 to Non-Final Office Action mailed Aug. 18, 2011", 9 pgs.
"U.S. Appl. No. 10/624,941, Advisory Action mailed Aug. 29, 2007", 3 pgs.
"U.S. Appl. No. 10/624,941, Final Office Action mailed Jun. 11, 2007", 12 pgs.
"U.S. Appl. No. 10/624,941, Non-Final Office Action mailed Mar. 17, 2006", 15 pgs.
"U.S. Appl. No. 10/624,941, Non-Final Office Action mailed Oct. 3, 2007", 16 pgs.
"U.S. Appl. No. 10/624,941, Non-Final Office Action mailed Oct. 17, 2006", 11 pgs.
"U.S. Appl. No. 10/624,941, Non-Final Office Action mailed Dec. 11, 2008", 6 pgs.
"U.S. Appl. No. 10/624,941, Notice of Allowance mailed Feb. 25, 2009", 6 pgs.
"U.S. Appl. No. 10/624,941, Preliminary Amendment mailed Apr. 26, 2005", 3 pgs.
"U.S. Appl. No. 10/624,941, Preliminary Amendment mailed Aug. 27, 2003", 3 pgs.
"U.S. Appl. No. 10/624,941, Response filed Jan. 14, 2009 to Non-Final Office Action mailed Dec. 11, 2008", 11 pgs.
"U.S. Appl. No. 10/624,941, Response filed Feb. 20, 2007 to Non-Final Office Action mailed Oct. 17, 2006", 11 pgs.
"U.S. Appl. No. 10/624,941, Response filed Jul. 16, 2008 to Non-Final Office Action mailed Mar. 17, 2008", 9 pgs.
"U.S. Appl. No. 10/624,941, Response filed Aug. 13, 2007 to Final Office Action mailed Jun. 11, 2007", 10 pgs.
"U.S. Appl. No. 10/624,941, Response filed Dec. 14, 2007 to Non-Final Office Action mailed Oct. 3, 2007", 11 pgs.
"U.S. Appl. No. 10/624,948, Advisory Action mailed Sep. 19, 2013", 3 pgs.
"U.S. Appl. No. 10/624,948, Examiner Interview Summary mailed Mar. 14, 2012", 2 pgs.
"U.S. Appl. No. 10/624,948, Examiner Interview Summary mailed Sep. 19, 2013", 1 pg.
"U.S. Appl. No. 10/624,948, Final Office Action mailed Mar. 23, 2012", 19 pgs.
"U.S. Appl. No. 10/624,948, Final Office Action mailed May 2, 2011", 18 pgs.
"U.S. Appl. No. 10/624,948, Final Office Action mailed Jun. 1, 2010", 14 pgs.
"U.S. Appl. No. 10/624,948, Final Office Action mailed Jun. 5, 2013", 22 pgs.
"U.S. Appl. No. 10/624,948, Non Final Office Action mailed Jan. 22, 2013", 28 pgs.
"U.S. Appl. No. 10/624,948, Non Final Office Action mailed Oct. 15, 2013", 29 pgs.
"U.S. Appl. No. 10/624,948, Non Final Office Action mailed Oct. 25, 2011", 16 pgs.
"U.S. Appl. No. 10/624,948, Non-Final Office Action mailed Feb. 8, 2010", 15 pgs.
"U.S. Appl. No. 10/624,948, Non-Final Office Action mailed Mar. 30, 2007", 5 pgs.
"U.S. Appl. No. 10/624,948, Non-Final Office Action mailed Oct. 14, 2010", 3 pgs.
"U.S. Appl. No. 10/624,948, Notice of Allowance Aug. 8, 2007", 4 pgs.
"U.S. Appl. No. 10/624,948, Notice of Allowance mailed Mar. 7, 2014", 7 pgs.
"U.S. Appl. No. 10/624,948, Preliminary Amendment mailed Apr. 26, 2005", 3 pgs.
"U.S. Appl. No. 10/624,948, Preliminary Amendment mailed Aug. 27, 2003", 3 pgs.
"U.S. Appl. No. 10/624,948, Response filed Feb. 17, 2014 to Non Final Office Action mailed Oct. 15, 2013", 29 pgs.
"U.S. Appl. No. 10/624,948, Response filed Feb. 27, 2012 to Non Final Office Action mailed Oct. 25, 2011", 25 pgs.
"U.S. Appl. No. 10/624,948, Response filed Apr. 8, 2011 to Non-Final Office Action mailed Oct. 14, 2010", 27 pgs.
"U.S. Appl. No. 10/624,948, Response filed May 10, 2010 to Non Final Office Action mailed Feb. 8, 2010", 25 pgs.
"U.S. Appl. No. 10/624,948, Response filed May 18, 2007 to Non-Final Office Action mailed Mar. 30, 2007", 30 pgs.
"U.S. Appl. No. 10/624,948, Response filed Jun. 25, 2012 to Final Office Action mailed Mar. 23, 2012", 26 pgs.
"U.S. Appl. No. 10/624,948, Response filed Sep. 1, 2010 to Final Office Action mailed Jun. 1, 2010", 26 pgs.
"U.S. Appl. No. 10/624,948, Response filed Sep. 3, 2013 to Final Office Action mailed Jun. 5, 2013", 27 pgs.
"U.S. Appl. No. 10/624,948, Response filed Oct. 3, 2011 to Final Office Action mailed May 2, 2011", 24 pgs.
"U.S. Appl. No. 10/624,948, Response filed May 22, 2013 to Non Final Office Action mailed Jan. 22, 2013", 27 pgs.
"U.S. Appl. No. 12/403,839, Final Office Action mailed May 31, 2011", 40 pgs.
"U.S. Appl. No. 12/403,839, Non Final Office Action mailed Nov. 14, 2011", 41 pgs.
"U.S. Appl. No. 12/403,839, Non Final Office Action mailed Nov. 18, 2010", 59 pgs.
"U.S. Appl. No. 12/403,839, Notice of Allowance mailed Apr. 5, 2012", 5 pgs.
"U.S. Appl. No. 12/403,839, Response filed Mar. 12, 2012 to Non Final Office Action mailed Nov. 14, 2011", 7 pgs.
"U.S. Appl. No. 12/403,839, Response filed Mar. 18, 2011 to Non Final Office Action mailed Nov. 18, 2010", 8 pgs.
"U.S. Appl. No. 12/403,839, Response filed Aug. 31, 2011 to Final Office Action mailed May 31, 2011", 9 pgs.
"U.S. Appl. No. 13/343,780, Notice of Allowance mailed Apr. 5, 2012", 12 pgs.
"U.S. Appl. No. 13/795,245, Examiner Interview Summary mailed Feb. 24, 2015", 2 pgs.
"U.S. Appl. No. 13/795,245, Final Office Action mailed Jun. 13, 2014", 11 pgs.
"U.S. Appl. No. 13/795,245, Non Final Office Action mailed Jan. 14, 2014", 10 pgs.
"U.S. Appl. No. 13/795,245, Non Final Office Action mailed Nov. 13, 2014", 13 pgs.
"U.S. Appl. No. 13/795,245, Notice of Allowance mailed Mar. 10, 2015", 5 pgs.
"U.S. Appl. No. 13/795,245, Notice of Allowance mailed Jun. 15, 2015", 5 pgs.
"U.S. Appl. No. 13/795,245, Response filed Feb. 2, 2015 to Non Final Office Action mailed Nov. 13, 2014", 7 pgs.
"U.S. Appl. No. 13/795,245, Response filed Jun. 6, 2014 to Non Final Office Action mailed Jan. 14, 2014", 8 pgs.
"U.S. Appl. No. 13/795,245, Response filed Aug. 11, 2014 to Final Office Action mailed Jun. 15, 2014", 8 pgs.
"U.S. Appl. No. 13/798,350, Final Office Action mailed Apr. 9, 2014", 10 pgs.
"U.S. Appl. No. 13/798,350, Non Final Office Action mailed Dec. 5, 2013", 11 pgs.
"U.S. Appl. No. 13/798,350, Notice of Allowance mailed Sep. 17, 2014", 7 pgs.
"U.S. Appl. No. 13/798,350, Response filed Jan. 2, 2014 to Non Final Office Action Dec. 5, 2013", 8 pgs.
"U.S. Appl. No. 13/798,350, Response filed Aug. 11, 2014 to Final Office Action mailed Apr. 9, 2014", 8 pgs.
"U.S. Appl. No. 14/800,758, Preliminary Amendment filed Jul. 16, 2015", 6 pgs.
"U.S. Appl. No. 90/010,939, Ex-Parte Re-examination Office Action Mailed Nov. 5, 2010", 16 pgs.

\* cited by examiner

| ID | Return | Predicate | Mnemonic | Family | Description |
|---|---|---|---|---|---|
| A | b | A(z) | Ascii | Test | Test literal string |
| B | b | B(m) | Bitmask | Test | Test using bitmask |
| C | v | C() | Case | Decision | Branch using multiple cases |
| D | v | D(label) | Do | Iteration | Start Loop (ends on lable) |
| E | v | E(f,b,b...) | Each | Iteration | Repeat function with each byte in list |
| F | v | F(n, f) | For | Iteration | Repeat function on n buffer bytes |
| G | v | G (label) | Goto | Decision | Goto label in sig |
| H | B | H (d) | Heuristic | Test | Test d against heuristic flags |
| I | v | I (f, l) | If | Decision | If test f branch else continue |
| J | v | J(size) | Jump | Pointer | Jump using buffer value of size |
| K | B | K(reserved) | Keyword | Function | Process keyword |
| L | B | L(b) | Literal | Test | Test literal |
| M | v | M(name) | Macro | Function | Execute macro NAME |
| N | B | N(logic) | Near | Test | Test using relative logic |
| O | B | O(n, method) | Order | Test | Order (sort) n buffer bytes using method |
| P | v | P(name) | Process/Procedure | Function | Execute process name |
| Q | B | Q(logic) | Query | Test | Test using ranged logic |
| R | v | R(p) | Rewind | Pointer | Reset buffer stream pointer |
| S | B | S (n, k) | Seek | Pointer | Reposition buffer stream pointer |
| T | B | T (logic) | Test | Test | Test using positional logic |
| U | b | U(z) | Uppercase | Test | Test after uppercasing buffer string |
| V | b | V(logic) | Variable | Test | Test using ranged logic |
| W | b | W(c) | Wildcard | Test | Simply (one byte) wildcards |
| X | b | X(b) | Xray/Xor | Test | Test using x or mask based on b |

HARDWARE BASED DETECTION DEVICES FOR DETECTING NETWORK TRAFFIC CONTENT AND METHODS OF USING THE SAME

RELATED APPLICATION DATA

This application is a continuation of and claims priority to U.S. patent application Ser. No. 13/798,350, filed Mar. 13, 2013, and further claims priority to U.S. patent application Ser. No. 10/624,914, filed Jul. 21, 2013, and issued as U.S. Pat. No. 8,788,650 on Jul. 22, 2014, and further claims priority to U.S. Provisional Application Nos. 60/397,147, 60/397,304, 60/397,033, 60/397,302, and 60/397,034, all filed Jul. 19, 2002, the disclosures of which are each expressly incorporated herein by reference.

BACKGROUND OF THE INVENTION

1. Field of the Invention

The field of the invention relates to computer systems and computer networks, and more particularly, to systems and methods for detecting content of computer and network traffic.

2. Background of the Invention

The generation and spreading of computer viruses are major problems in computer systems and computer networks. A computer virus is a program that is capable of attaching to other programs or sets of computer instructions, replicating itself, and/or performing unsolicited or malicious actions on a computer system. Viruses may be embedded in email attachments, files downloaded from Internet, and macros in MS Office files. The damage that can be done by a computer virus may range from mild interference with a program, such as a display of unsolicited messages or graphics, to complete destruction of data on a user's hard drive or server.

To provide protection from viruses, most organizations have installed virus scanning software on computers in their network. However, these organizations may still be vulnerable to a virus attack until every host in their network has received updated anti-virus software. With new attacks reported almost weekly, organizations are constantly exposed to virus attacks, and spend significant resources ensuring that all hosts are constantly updated with new anti-virus information. Furthermore, anti-virus programs that operate at the application-level require enormous computing resources, making such anti-virus programs expensive to deploy and manage.

Besides virus attacks, many organizations also face the challenge of dealing with inappropriate content, such as email spam, misuse of networks in the form of browsing or downloading inappropriate content, and use of the network for non-productive tasks. Many organizations are struggling to control access to appropriate content without unduly restricting access to legitimate material and services. Currently, the most popular solution for blocking unwanted web activity is to block access to a list of banned or blacklisted web sites and pages based on their URLs. However, such approach may be unnecessarily restrictive, preventing access to valid content in web sites that may contain only a limited amount of undesirable material. As with virus scanning, the list of blocked URLs requires constant updating.

Many email spam elimination systems also use blacklists to eliminate unwanted email messages. These systems match incoming email messages against a list of mail servers that have been pre-identified to be spam hosts, and prevent user access of messages from these servers. However, spammers often launch email spam from different hosts every time, making it difficult to maintain a list of spam servers.

Accordingly, improved systems and methods for detecting content of computer and network traffic would be useful.

SUMMARY OF THE INVENTION

A device for detecting network traffic content is provided. The device includes a first input port configured to receive one or more signatures, each of the one or more signatures associated with content desired to be detected, a second input port configured to receive data associated with network traffic content. The device also includes a processor configured to process the one or more signatures and the data to determine whether the network traffic content matches the content desired to be detected, and an output port configured to couple the device to a computer system of an intended recipient of the network traffic content. The output port passes the network traffic content to the computer system when it is determined that the network traffic content does not match the content desired to be detected. In alternative embodiments, the device can include a plurality of input ports and/or a plurality of output ports.

In some embodiments of the invention, a method for detecting network traffic content includes receiving one or more signatures, wherein each of the one or more signatures is associated with content desired to be detected, receiving data associated with network traffic content, and processing the one or more signature and the data to determine whether the network traffic content matches the content desired to be detected. The processing is performed by a device associated with a firewall of a computer system.

Other aspects and features of the invention will be evident from reading the following detailed description of the preferred embodiments, which are intended to illustrate, not limit, the invention.

BRIEF DESCRIPTION OF THE DRAWINGS

The drawings illustrate the design and utility of preferred embodiments of the present invention, in which similar elements are referred to by common reference numerals. In order to better appreciate how advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting its scope, the invention will be described and explained with additional specificity and detail through the use of the accompanying drawings.

DETAILED DESCRIPTION OF THE PREFERRED EMBODIMENTS

Various embodiments of the present invention are described hereinafter with reference to the figures. It should be noted that the figures are not drawn to scale and that elements of similar structures or functions are represented by like reference numerals throughout the figures. It should also be noted that the figures are only intended to facilitate the description of specific embodiments of the invention. They are not intended as an exhaustive description of the invention or as a limitation on the scope of the invention. In addition, an illustrated embodiment needs not have all the aspects or advantages of the invention shown. An aspect or an advantage described in conjunction with a particular embodiment of the present invention is not necessarily limited to that embodiment and can be practiced in any other embodiments of the present invention even if not so illustrated.

Figure 1:
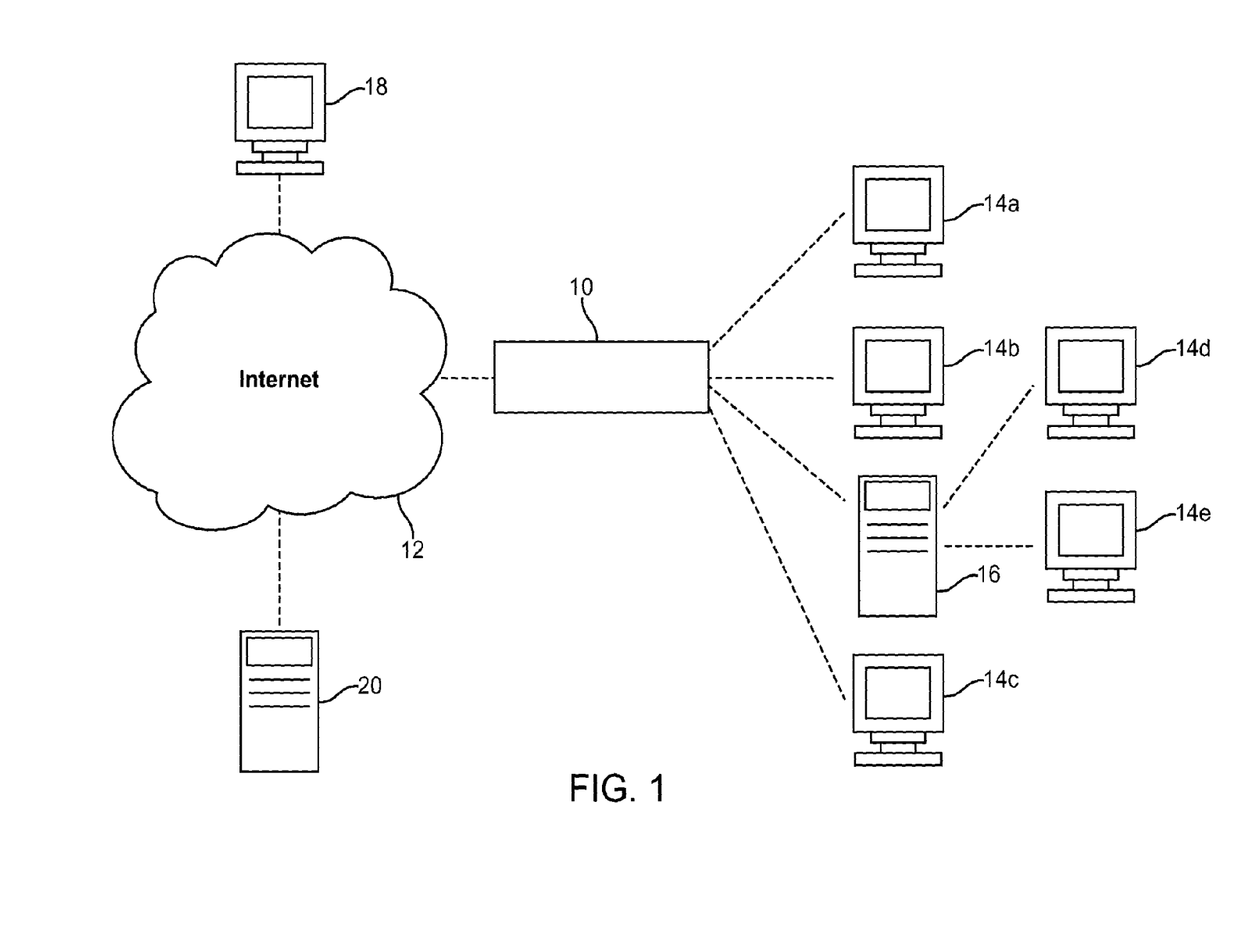
FIG. 1 illustrates a detection device in accordance with some embodiments of the invention, and an example of a network environment in which detection device can be operated.

FIG. 1 illustrates a detection device 10 in accordance with embodiments of the present invention, and an example of a network environment in which detection device 10 can be operated. Detection device 10 is configured to detect a program content, such as a virus, and/or a non-program content, such as a web content, being transmitted from Internet 12 to users 14a-e. For example, a sender 18 connected to Internet 12 may send files containing viruses, worms, or other malicious programs, to one or more of the users 14a-c and server 16 via Internet 12. Viruses may also be copied from a server 20 and transmitted to users 14a-c and network server 16 through Internet 12. Viruses transmitted to network server 16 may also infect users 14d and 14e connected to network server 16. Detection device 10 scans network traffic content transmitted from Internet 12 and prevents undesirable content, such as a virus, a worm, an email spam, and a web page containing undesirable content, from being transmitted to users 14a-e. Besides detecting content, detection device 10 may also modify or re-direct network traffic content such that, for examples, a virus may be removed from a network stream, or a HTTP request may be blocked. In some embodiments, detection device 10 may be implemented as a firewall, a component of a firewall, or a component that is configured to be coupled to a firewall.

Figure 2:
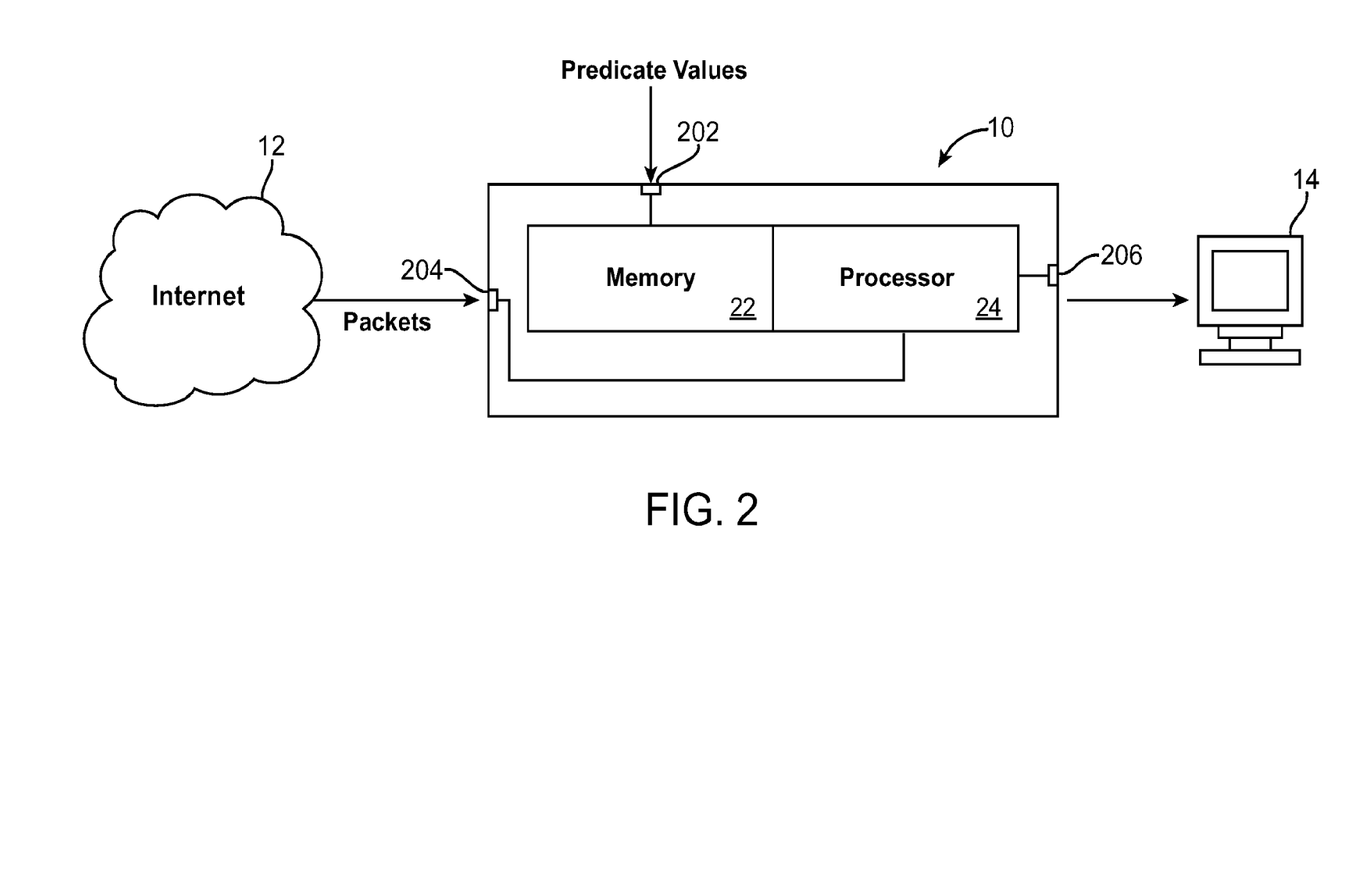
FIG. 2 illustrates a block diagram of detection device of FIG. 1.

FIG. 2 shows content detection device 10 of FIG. 1 in further detail. As shown in FIG. 2, detection device 10 includes a memory 22 and a processor 24 coupled to memory 22. Detection device 10 also includes a first input port 202 for inputting data to memory 22, a second input port 204 for receiving network traffic packets from Internet 12 or a network, and an output port 206 coupled to processor 24. Output port 206 is configured for transmitting filtered network traffic packets to user 14. In alternative embodiments, memory 22 can be implemented as a part of processor 24.

Memory 22 is adapted for storing data to be processed by processor 24. Data may be transmitted to memory 22 via input port 202 from a user or an administrator. For example, a user or an administrator can transmit data to memory 22 via a wire, a telephone line, a T1-line, a cable of a cable modem, or other types of transmitter connected to port 202. Data may also be transmitted to memory 22 via an infrared transmitter, in which case, port 202 would include an infrared receiver. In the illustrated embodiments, memory 22 is adapted for storing one or more signatures, each of which associated with content desired to be detected by detection device 10. The signatures will be described in detail below.

In the illustrated embodiments, the processor 24 includes an application-specific integrated circuit (ASIC), such as a semi-custom ASIC processor or a programmable ASIC processor. ASICs, such as those described in Application-Specific Integrated Circuits by Michael J. S. Smith, Addison-Wesley Pub Co. (1st Edition, June 1997), are well known in the art of circuit design, and therefore will not be described in further detail herein. Processor 24 is configured to receive packets from Internet 12, process packets based on data stored in memory 22; and generate a result based on the processing of the packets. It should be noted that processor 24 is not limited to those described previously, and that processor 24 can also be any of a variety of circuits or devices that are capable of performing the functions described herein. For example, in alternative embodiments, processor 24 can include a general purpose processor, such as a Pentium processor.

Figure 3:
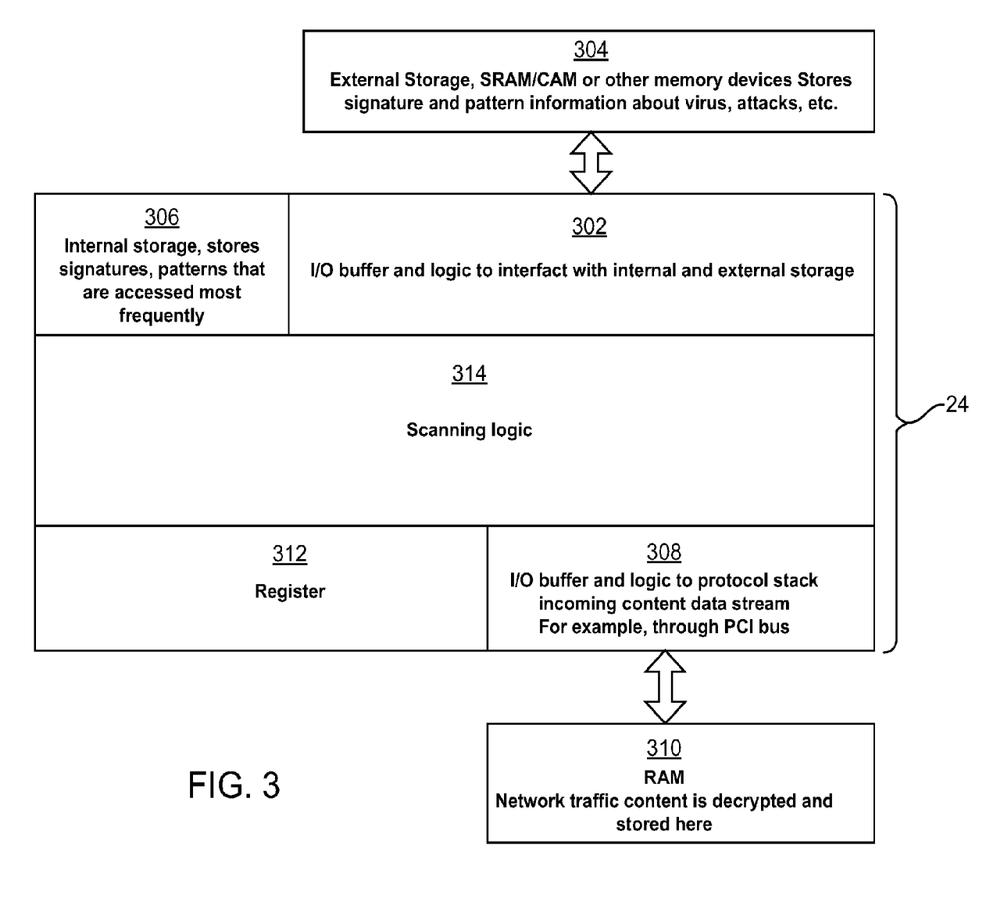
FIG. 3 illustrates an architecture of the processor of detection device of FIG. 2.

FIG. 3 shows an architecture of processor 24 in accordance with some embodiments of the present invention. Processor 24 includes a first 1/0 buffer and logic 302, an internal storage 306, a second 1/0 buffer and logic 308, a register 312, and a scanning logic 314. 1/0 buffer and logic 302 is configured for processing data (e.g., information associated with content desired to be detected) received from an external memory 304 such that data of desirable format can be stored in internal storage 306. 1/0 buffer and logic 308 is configured for processing decrypted network traffic content received from an external memory 310 (such as a RAM) such that data of desirable format can be stored in register 312. In some embodiments of the invention, one or both of 1/0 buffer and logics 302 and 308 can also process data generated by scanning logic 314 such that data of desirable format can be transmitted to external storages 304 and 310, respectively. Scanning logic 314 processes network traffic content stored in register 312 based on data stored in internal memory 306, and determines whether network traffic content contains content desired to be detected. In the illustrated embodiments of the invention, 1/0 buffer and logics 302, 308, and scanning logic 314 are implemented in processor 24. In alternative embodiments, separate processors or components may be used to implement buffer and logics 302 and 308 and scanning logic 314. In addition, internal storage 306 and register 312 can both be implemented using a single memory, such as memory 22. In alternative embodiments, internal storage 306 and register 312 can each be implemented using a separate memory.

Figure 4:
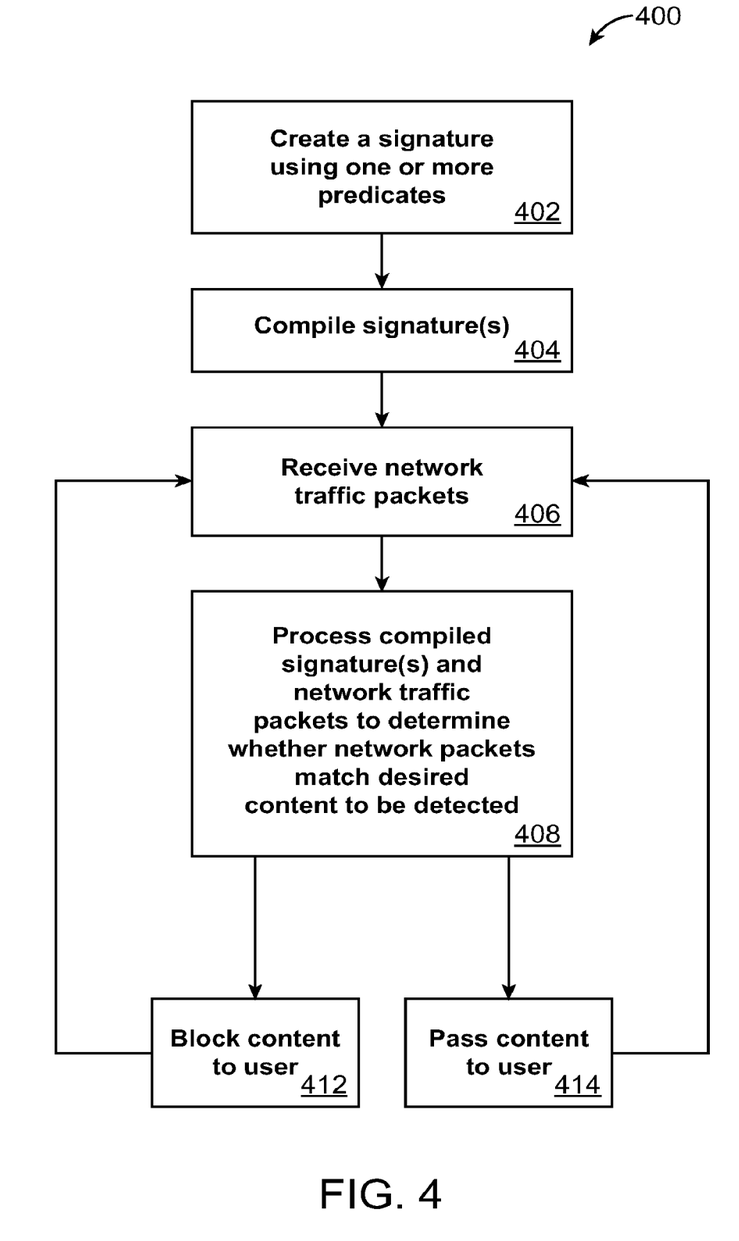
FIG. 4 is a flow chart showing a process for detecting content of network traffic.

A method 400 for detecting network traffic content using detection device 10 will now be described with reference to FIG. 4. Initially, content pattern recognition language (CPRL) is used to create a signature, which represents a symbolic detection model for certain prescribed content, such as a virus, a worm, a web content, a Trojan agent, an email spam, a packet transmitted by a hacker, etc., desired to be detected (Step 402). Depending on an implementation of the CPRL, in some embodiments of the invention, the signature may be expressed in a form similar to a set of sentences or phrases in predicate logic. The pattern recognition signature created for a given content desired to be detected is tested for validity, compiled, and interpreted by a set of functions implemented using processor 24. In 'some embodiments of the invention, the CPRL used is a programming language that supports testing, branching, looping, and/or recursion.

Figure 5:
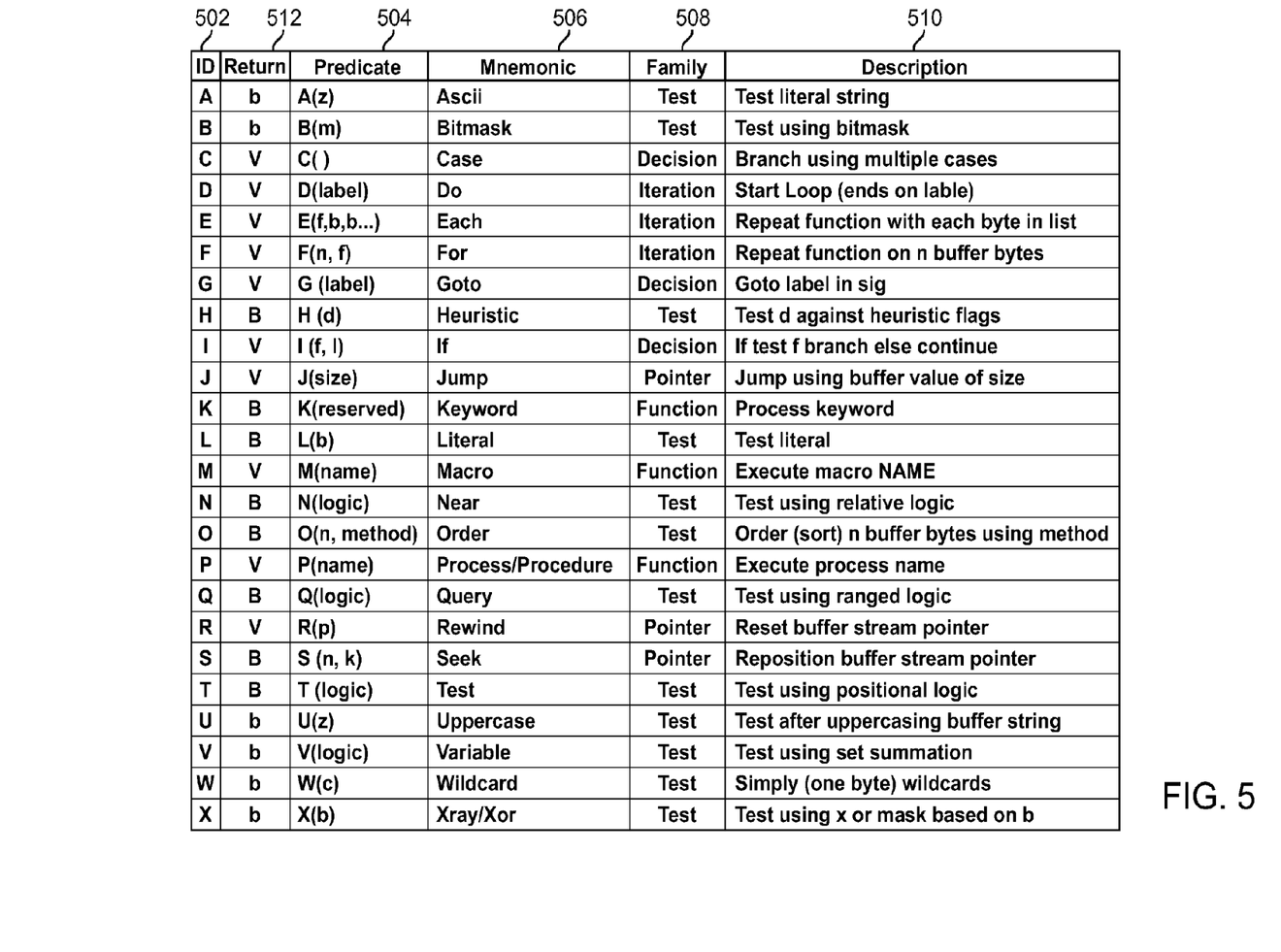
FIG. 5 is a table listing examples of predicate that may be used to control a logic of processor of FIG. 2.

FIG. 5 is a table showing examples of predicates that can be used to create a signature of content desired to be detected. Column 502 shows identifications of predicates that are the basic roots or components of a CPRL. Although only identifications "A" through "X" are shown, in alternative embodiments, a predicate identification can also includes other letters, a number, a combination of letters, mathematical operator, logical operator, punctuations, and/or combination thereof. Column 506 shows mnemonics represented by respective predicates.

Column 504 shows formats in which predicates A-Z are used. For examples, predicate "D" has "label" as its argument, and predicate "M" has "name" as its argument. In some embodiments, the argument of a predicate may include one or a combination of bytes, with each of the bytes having two characters. In alternative embodiments, the argument can also include a number, a letter, a combination of letters, a sentence, a mathematical operator, a logical operator, a punctuation, and/or combination thereof. In other embodiments, a predicate may not require an argument.

In the illustrated embodiments, each predicate of a signature is compiled into a byte stream that controls a logic of processor 24. Column 510 describes functions that are performed by processor 24 based on respective predicates. Appendix A provides exemplary specifications for the predicates illustrated in FIG. 5. It should be understood by those skilled in the art that the functions prescribed by the predicates should not be limited to the examples shown in FIG. 5, and that other functions may also be prescribed to be performed by processor 24 based on other predicates. Each function prescribed by the respective predicate may return a variable, such as a Boolean value, a number, a pointer, a "void", or other types of return value (Column 512).

The predicates may be categorized by the types of function they perform (Column 508). In the illustrated embodiments, CPRL includes five families of predicates, namely, "Test", "Decision", "Iteration", "Function", and "Pointer". A "test" type predicate provides instruction that causes processor 24 to test one or more variables using a prescribed operation. A "decision" type predicate provides instruction that causes processor 24 to decide which operation to perform based on a prescribed condition. An "iteration" type predicate provides instruction that causes processor 24 to repeat a prescribed function. A "function" type predicate provides instruction that causes the processor 24 to execute a prescribed function. A "pointer" type predicate provides instruction that causes processor 24 to position or reset a buffer stream pointer. Although five types of predicates are shown, in alternative embodiments, CPRL may have other different types of predicates.

Like predicate logic, the signature codified using CPRL is treated as a formula made up of logical elements and is rule-based. Accordingly, each signature must meet these rules in order to form a well-formed formula (wff). Codifying signature using a predicate-based system is advantageous in that the codified signature is much more readable and intuitive than memorizing and using an extensive collection of pattern recognition directives in a form of hexadecimal code instructions embedded in a signature stream. In some embodiments, the predicates can be formalized such that they are similar to inline macros, thereby allowing a user to easily create signatures without having to learn a completely new set of programming language.

Unlike traditional virus signatures, which are used to detect virus using byte-by-byte comparison, a signature created using CPRL represent one or more instructions that control an operation of a processor being used to detect content. For examples, a signature created using CPRL may provide instructions for calling functions, pointing to a different signature, calling an interpreter of the signature recursively, responding to a returned information, and/or performing other functions. As such, CPRL is a true pattern recognition language, and is far more powerful than traditional antivirus signatures. It should be understood by those skilled in the art that the scope of the invention• is not limited to the examples of CPRL described previously, and that other languages or symbolic models may also be used to codify signatures.

The signature(s) may be codified by one or more service providers. For example, when a new virus is discovered, a service provider may codify the corresponding signature and send the signature to the detection device 10 as an update. Alternatively, or additionally, one or more users may also codify the signature if a new virus is discovered. The codifying of the signature(s) may be performed on a computer platform. For example, a suitable editor may be used for writing and/or editing the signature(s). In some embodiments, an integrated development environment (IDE) may be employed for writing and/or editing the signature(s). A graphical interface may also be used to assist writing and/or editing the signature(s). The signature, (i.e., resulting code) may be stored in a computer readable medium for future processing.

Returning to FIG. 4, the signature is next compiled into a byte stream or machine language such that the signature can be processed by processor 24, and the compiled data is stored within a memory of detection device 10 (Step 404). The compiling of the signature may be performed by a suitable compiler. In some embodiments, after the signature is compiled, the compiled code (e.g., in a form of byte streams) is transmitted to memory 22 of detection device 10 via a telephone line, a T1-line, a wireless transmitter, etc. In such case, internal storage 306 may be used to store signatures that are processed the most frequent. In other embodiments, instead of storing the compiled code in memory 22, the compiled code is stored in a separate memory. In such case, memory 22 may be used to store signatures that are processed the most frequent.

Figure 6:
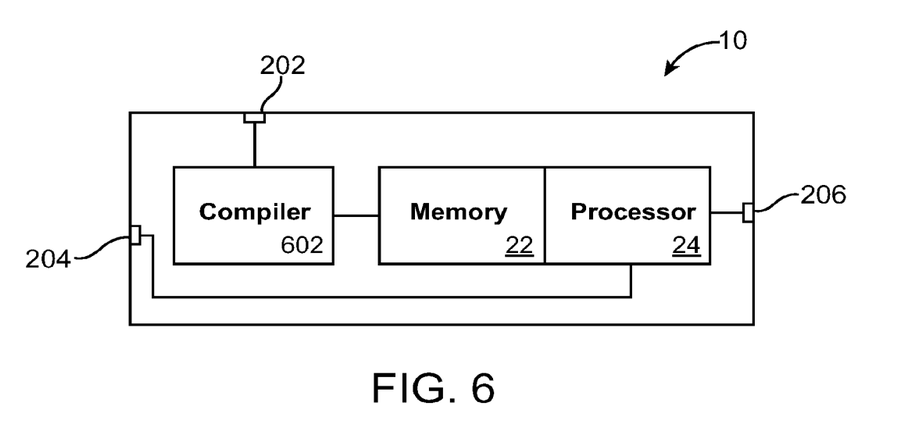
FIG. 6 illustrates a block diagram of a detection device in accordance with alternative embodiments of the invention, particularly showing detection device including a compiler.

In the illustrated embodiments, the compiling is performed by a compiler that is not a part of detection device 10. In alternative embodiments, the detection device 10 may include a compiler 602 for compiling the signature (FIG. 6). In such case, the signature, in its un-compiled form, may be stored within memory 22 of the detection device 10, and the compiled signature may be stored in internal storage 306, in memory 22, or another separate memory of detection device 10.

Next, detection device 10 receives network traffic packets to be screened (Step 406). For examples, web content, emails, and other data transmitted through a network may be decrypted and converted into packets, which are then sent to processor 24 of detection device 10 via input port 204 for processing. 1/0 buffer and logic 308 may be used to translate decrypted network traffic content into a format such that the decrypted network traffic content can be processed by processor 24. In some embodiments, processor 24 may receive a plurality of sessions (of network traffic) concurrently. In such case, processor 24 may execute one or more instruction on a first session, execute one or more instruction on a second session, and then switch back and execute additional instruction on the first session.

Based on the compiled signatures, processor 24 executes one or more functions to determine whether the network traffic content matches the content desired to be detected (Step 408). For example, processor 24 may execute scanning logic 314 based on one or more instructions prescribed by a CPRL signature, and determine whether the network traffic content matches or is associated with the content desired to be detected.

Processor 24 may detect a variety of contents based on instructions prescribed by CPRL signatures. For example, a signature may provide instruction that causes processor 24 to perform worm scanning. When configured to perform worm scanning, processor 24 may scan HTTP requests by scanning their originating web page for known viral patterns such as Code Red, which is programmed to gain entry to a server. To scan email attachments for worms, processor 24 may look for filenames, such as readme.exe and sample.exe, known to be used by worms.

In other embodiments, based on instructions prescribed by CPRL signatures, processor 24 may also detect virus by performing signature scanning, macro scanning, and heuristic scanning (e.g., static heuristic scanning or dynamic heuristic scanning). To perform signature scanning, processor 24 may scan target file for byte-strings that are known to identify viruses. If all of the byte strings for a particular virus are matched, the virus is considered present in the file. To perform macro scanning, processor 24 may extract one or more macros from MS Office file and scan them for known macro virus strings. Processor 24 may also analyze macros for peculiar behavior such as importing code, exporting code, writing to a registry, and/or attempting to disable a security feature. If any of the macro tests produces a positive result, a macro virus is deemed present in the MS Office file. To perform heuristic scanning, processor 24 may scan files for known byte strings that indicate a presence of a virus. For example, in the program byte, "B4 09 BA 20 01 CD 21 B8 02 3D BA 12 34 CD 21 CC B8 FF 4C CD 21", processor 24 can match the signature, "88 02 3D BA ?? ?? CD 21" (representing a program that opens a file), and the signature, "B8 ?? 4C CD 21" (representing a program that terminates itself).

In other embodiments, based on instructions prescribed by CPRL signatures, processor 24 may also detect a hacking of a computer system. For example, a CPRL signature may provide one or more instructions to processor 24 that causes processor to detect a SYN packet, which may be sent by a hacker to determine which ports of a gateway are opened. It should be understood by those skilled in the art that the types of content that can be detected by processor 24 are not limited to those discussed previously, and that other types of content, such as a web content, an email spam, a Trojan agent, or other undesirable content may also be detected by controlling the logic of processor 24 using a • CPRL signature.

In further embodiments of the invention, processor 24 may also search for a variety of target files, such as files that may be executable (e.g., .exe, .bat, and .com), visual basic files (.vbs), compressed files (.zip, .gzip, .tar, .hta, and rar), screen saver files (.scr), dynamic link libraries (.dll), MS Office files, or other types of files. Processor 24 may also be configured such that it is capable to parse Multipurpose Internet Mail Extensions (MIME) files to find target file(s). In alternative embodiments, a separate processor, such as a general purpose processor may be used to search for target files that may contain content desired to be detected. The target files are then transmitted to processor 24, which determines whether the target files contain content desired to be detected.

If it is determined that network traffic content matches with content desired to be detected, processor 24 then prevents such network traffic content from being transmitted to users (Step 412). In some embodiments of the invention, processor 24 may cause a message to be sent to a user, notifying the user that a prescribed content has been detected. In other embodiments of the invention, processor 24 may cause a detected content to be erased, or remove undesirable portion(s) of the network traffic content before transmitting it to a user.

If it is determined network traffic content does not match with content desired to be detected, processor 24 then passes such content to a user (Step 414).

Figure 7:
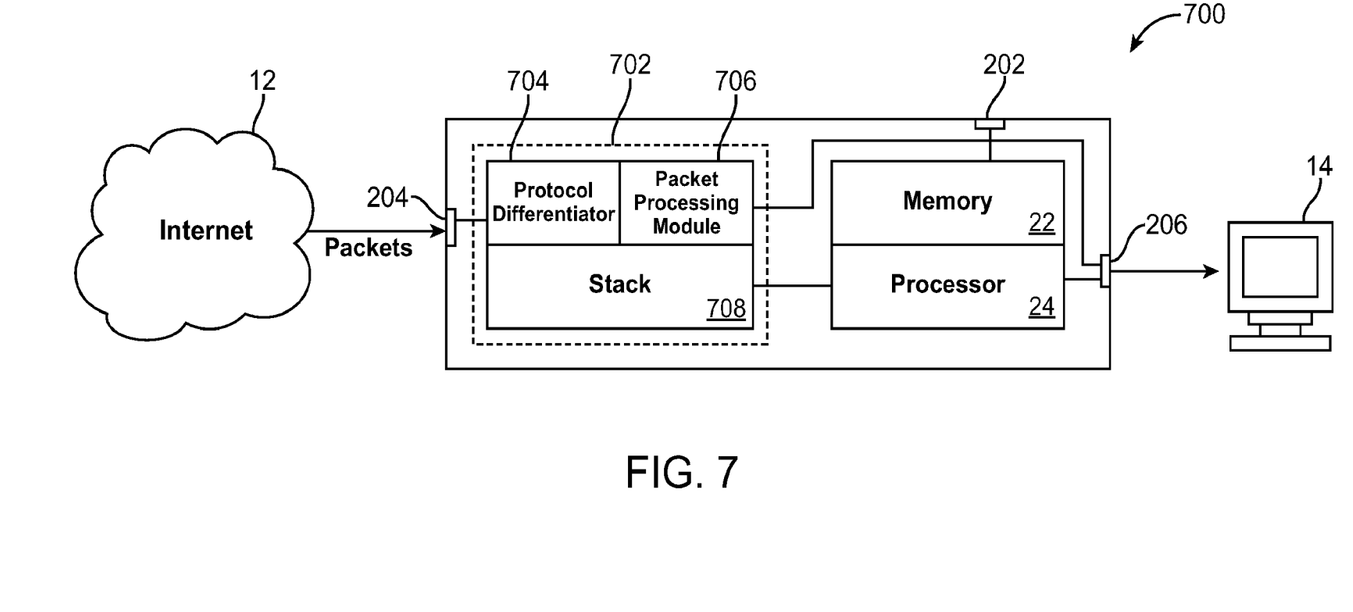
FIG. 7 illustrates a block diagram of another detection device in accordance with alternative embodiments of the invention, particularly showing the detection device including a processor configured for managing network traffic flow.

FIG. 7 shows detection device 700 in accordance with alternative embodiments of the invention. As shown in FIG. 7, in addition to memory 22 and processor 24, detection device 700 also includes a second processor 702 (network traffic management module) configured for managing network traffic flow. Processor 702 includes a protocol differentiator 704 for determining the types of content being screened, a packet processing module 706 that performs basic functions of a network gateway, and a stack 708 for receiving data to be processed by processor 24. In some embodiments, stack 708 may convert network traffic content into content stream that can be processed by processor 24. Processor 702 can be a Pentium processor, a Motorola processor, or other processor capable of performing the functions described herein. In the illustrated embodiments, stack 708 is a program that is implemented in processor 702. In alternative embodiments, stack 708 is a program that is implemented in processor 24, or in both processors 24 and 702. In other embodiments of the invention, stack 708 can be a device, such as a memory device, that is a part of processor 24 or 702. In alternative embodiments, stack 708 can also be a separate device coupled to processor 702 or to processor 24. In such case, processor 702 or processor 24 does not include stack 708. In further embodiments of the invention, processor 24 and processor 702 may be implemented using a single processor.

During use, network traffic is sent to processor 702 via port 204. Protocol differentiator 704 examines headers of the network traffic and determines the types of content being screened. In some embodiments of the invention, each type of network traffic content is pre-assigned to a port of a network gateway by a default configuration. For example, HTTP, SMTP, POP, IMAP, and FTP data may each be pre-assigned to be transmitted through a designated port. In such case, protocol differentiator 704 can determine a type of content based on an identification of a port transmitting the network content. In other embodiments of the invention, protocol differentiator 704 can be configured to scan all available ports in order to determine a type of the network traffic content being screened.

Next, depending on the type of content received or the content protocol, protocol differentiator 704 passes network traffic data to either packet processing module 706 or stack 708. For example, certain types of network traffic content, such as DNS data or telnet data, may be considered as "safe" traffic content, while other types of network traffic content, such as HTTP content or emails, may be considered as "unsafe" traffic content (i.e., content that may contain virus, worms, or undesirable material); In the illustrated embodiments, protocol differentiator 704 is configured to pass safe traffic content to packet processing module 706, and unsafe traffic content to stack 708. In alternative embodiments, protocol differentiator 704 is configured to pass potentially undesirable network traffic content to both packet processing module 706 and stack 708. In such case, network traffic content that can be screened by conventional content filtering techniques may be passed to packet processing module 706, while other network traffic content, such as those that may contain virus or worms, may be passed to stack 708. In some embodiments of the invention, processor 702 may be programmable or configurable such that a user can prescribe certain types of network traffic content to be passed to packet processing module 706 or to stack 708.

After network traffic content is transmitted to packet processing module 706, packet processing module 706 processes the network traffic content to determine whether to pass the network traffic content to a user. In the illustrated embodiments, packet processing module 706 is configurable to have different content filtering settings. In such case, packet processing module 706 either blocks or allows content stream to be passed to a user, depending on the content filtering settings of packet processing module 706. For example, packet processing module 706 can scan web and email traffic for undesirable non-program content, such as a key word or a phrase, and blocks the entire message or the particular page that contains the undesirable content when a match is found. Alternatively, or additionally, packet processing module 706 can also send a message notifying a user. In some embodiments, packet processing module 706 may also perform one or more basic functions of a network gateway. For example, packet processing module 706 may include a firewall module that performs stateful inspection. Alternatively, or additionally, packet processing module 706 may also include a decryption module for decrypting incoming network content before transmitting the content to a user. Packet processing module 706 may also be configured to perform other basic or known functions of a network gateway. In alternative embodiments, firewall module and/or decryption module may be implemented as part(s) of processor 24. Those skilled in the art understands that protocol differentiator 704, packet processing module 706, stack 708, fire module, and decryption module may be implemented using hardware, software, or any combination thereof.

As discussed previously, unsafe traffic content are transmitted from protocol differentiator 704 to stack 708. Stack 708 converts the traffic content into content stream such that it can be processed by processor 24. In the illustrated embodiments, as network traffic content are received in stack 708, they may be organized and stored in stack 708 according to their service or protocol type. For example, HTTP stream, FTP stream, and email stream may each be stored in a designated memory slot of stack 708. In alternative embodiments, network traffic content may be stored in stack 708 in accordance with the order in which they are received, according to certain prescribed protocol or traffic shaping rules, or in accordance with other prescribed arrangements.

Next, processor 24 receives network content stream from stack 708 and analyzes the network content to determine if they contain a virus, a worm, a web content, a Trojan agent, an email spam, a packet transmitted by a hacker, or other undesirable content. Particularly, processor 24 may execute one or more functions to determine whether the network traffic content matches content desired to be detected, which is codified by a signature using CPRL, as discussed previously. The operations of processor 24 and memory 22 are described above in reference to FIG. 2. If it is determined that network traffic content matches content desired to be detected, processor 24 or processor 702 may prevent the network traffic content from being sent to a user, send a message to a user, or remove the undesirable portion from the network traffic content before transmitting it to the user. If it is determined that network traffic content does not match content desired to be detected, processor 24 then passes such content to a user. In the illustrated embodiments, processor 24 is configured to pass the content to a user. Alternatively, processor 24 may signal stack 708 or processor 702 to transmit the content to the user.

Figure 8:
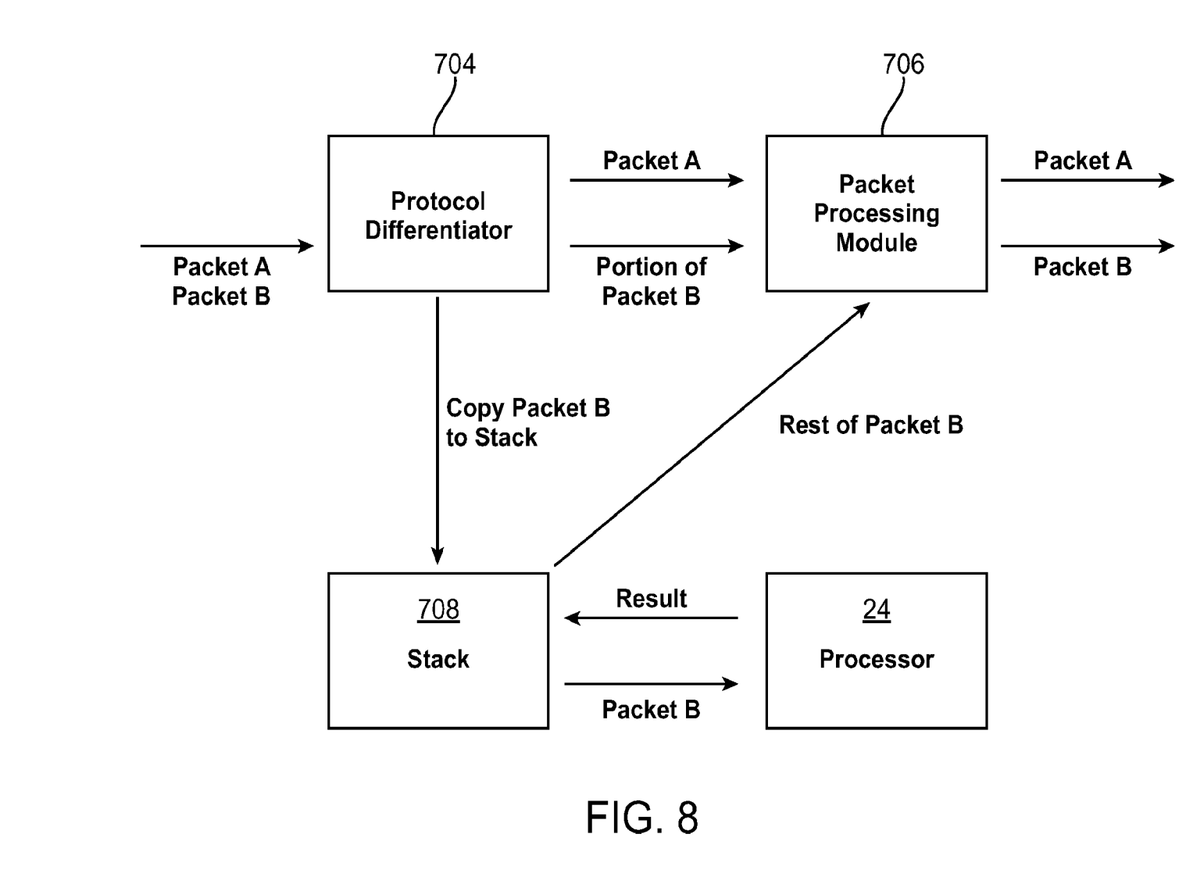
FIG. 8 shows examples of operation that may be performed by components of detection device of FIG. 7.

In the previously described embodiments, network traffic content transmitted to protocol differentiator 704 are either passed to packet processing module 706 or to stack 708. However, this needs not be the case. In alternative embodiments, in addition to traffic content that doesn't need to be processed by processor 24, protocol differentiator 704 may also pass at least a portion of traffic content that needs to be processed by processor 24 to packet processing module 706 (FIG. 8). As shown in FIG. 8, packets A and B are both transmitted to protocol differentiator 704. Based on the file type or protocol of packet A, protocol differentiator 704 determines that packet A does not need to be processed by processor 24. As such, protocol differentiator 704 passes packet A to packet processing module 706, which in turn, scans packet A and passes packet A to a user. On the other hand, based on the file type or protocol of packet B, protocol differentiator 704 determines that packet B is to be processed by processor 24. In such case, protocol differentiator 704 may make a copy of packet B and passes it to stack 708. Protocol differentiator 704 also transmits a portion of packet B to packet processing module 706 where the portion of packet B is temporarily stored, while processor 24 processes packet B to determine if it contains undesirable content. Alternatively, instead of transmitting the portion of packet B to packet processing module 706, protocol differentiator 704 may transmit a portion of packet B to a separate module (not shown), such as a memory, a buffer, or a processor, where the portion of packet B is temporarily stored. In such case, the separate module is configured for storing data ready to be sent to the user. If processor 24 determines that packet 8 does not contain undesirable content, processor 24 then signals stack 708 to transmit the rest of packet B to packet processing module 706 (or to the separate module if one is provided), which in turn, assembles packet Band passes packet B to the user. On the other hand, if processor 24 determines that packet 8 contains undesirable content, packet B is not passed to the user. In such case, processor 24 may cause a message to be sent to the user indicating that undesirable content has been detected, remove the undesirable portion from the network traffic content before transmitting to the user, and/or delete the network traffic content in its entirety.

The above described configuration is advantageous in that a packet (e.g., packet B) can be advanced through a traffic stream while it is being examined by processor 24 to determine if it contains undesirable content, thereby improving an efficiency of detection device 700. In alternative embodiments of the invention, instead of having protocol differentiator 704 transmit a copy of packet B to stack 708, packet processing module 706 can be configured to make a copy of packet B and transmit packet B to stack 708.

In the previously described embodiments, protocol differentiator 704 passes a portion of packet B to packet processing module 706 (or to a separate module if one is provided). However this needs not be the case. In alternative embodiments, instead of transmitting a portion of packet B, the entire packet B may be transmitted from protocol differentiator 704 to packet processing module 706. In such case, protocol differentiator 704 may flag packet B (e.g., by modifying a header, adding a header, or inserting data, e.g., a flag data, to packet B) before transmitting packet B to packet processing module 706 (or to buffer). The flag data added to packet B is designed to signal packet processing module 706 not to pass packet B to user until it is determined that packet B is a safe traffic content. Towards this end, signal packet processing module 706 is configured such that it passes non-flagged data and prevents flagged data from being sent to a user. When processor 24 determines that packet B does not contain an undesirable content, processor 24 can then signal packet processing module 706 to pass packet B to user.

Figure 9:
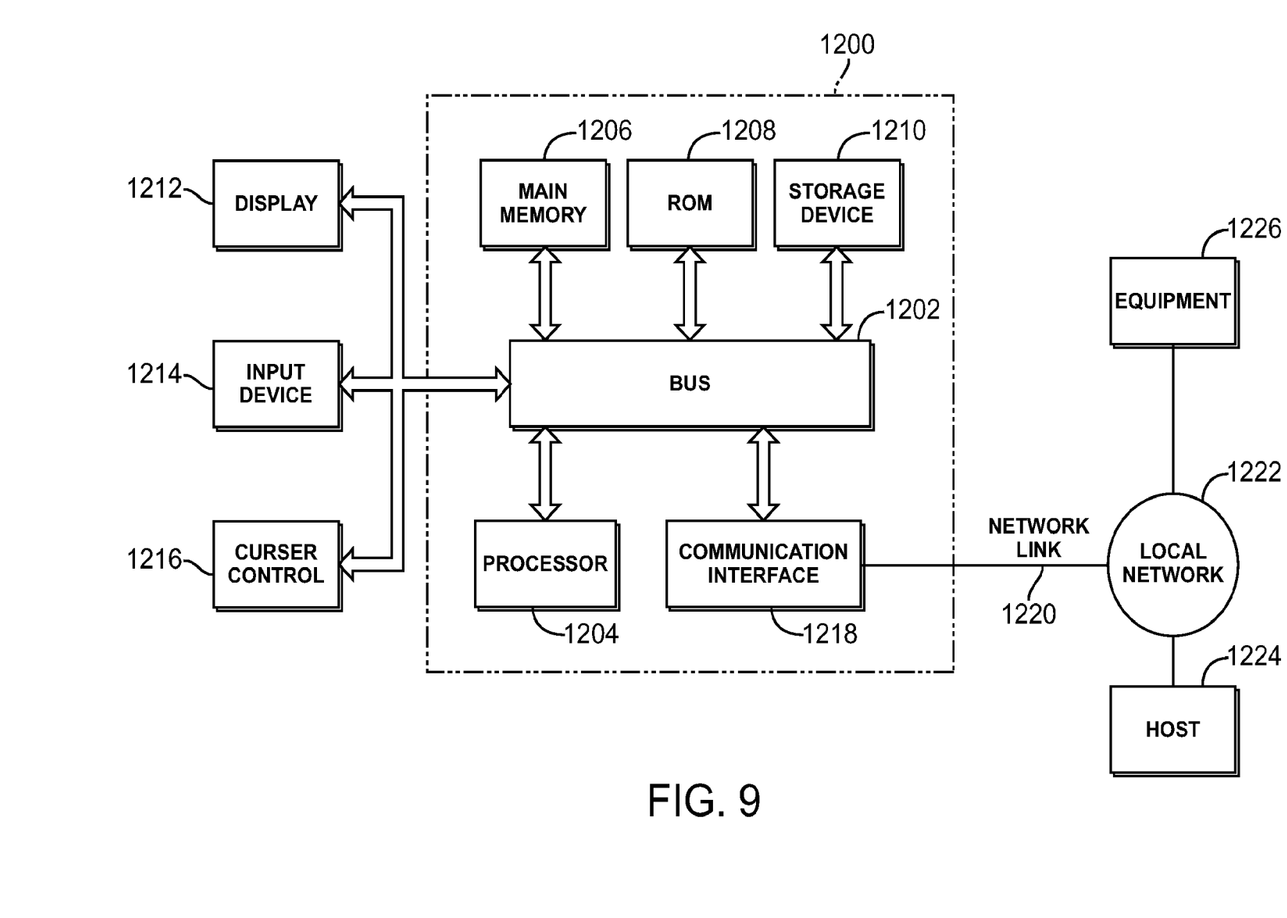
FIG. 9 is a diagram of a computer hardware system with which embodiments of the present invention can be implemented.

Although detection device 10 or 700 has been described as a hardware unit that is configured to be coupled to a user interface, such as a computer, those skilled in the art understand that a computer system may also be used to implement detection device to perform the same or similar functions described herein. FIG. 9 is a block diagram that illustrates an embodiment of a computer system 1200 upon which embodiments of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 may further include a read only memory (ROM) 1208 or other static storage device coupled to bus 1202 for storing static information and instructions for processor 1204. A data storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for processing network traffic content. According to some embodiments of the invention, such use may be provided by computer system 1200 in response to processor 1204 executing one or more sequences of one or more instructions contained in the main memory 1206. Such instructions may be read into main memory 1206 from another computer-readable medium, such as storage device 1210. Execution of the sequences of instructions contained in main memory 1206 causes processor 1204 to perform the process steps described herein. One or more processors in a multi-processing arrangement may also be employed to execute the sequences of instructions contained in main memory 1206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry data streams representing various types of information.

Network link 1220 typically provides data communication through one or more networks to other devices. For example, network link 1220 may provide a connection through local network 1222 to a host computer 1224. The data streams transported over the network link 1220 can comprise electrical, electromagnetic or optical signals. The signals through the various networks and the signals on network link 1220 and through communication interface 1218, which carry data to and from computer system 1200, are exemplary forms of carrier waves transporting the information. Computer system 1200 can send messages and receive data, including program code, through the network(s), network link 1220, and communication interface 1218. Although one network link 1220 is shown, in alternative embodiments, communication interface 1218 can provide coupling to a plurality of network links, each of which connected to one or more local networks. In some embodiments, computer system 1200 may receive data from one network, and transmit the data to another network. Computer system 1200 may process and/or modify the data before transmitting it to another network.

Although the methods and the detection devices have been described with reference to detecting a virus, a worm, a web content, a Trojan agent, an email spam, and a packet transmitted by a hacker, it should be understood that the same or similar methods and devices may also be used to detect other content. Particularly, the predicates described herein, or similar predicates, may also be used to codify other types of content (as defined by a user) that is desired to be detected. In addition, although examples of predicates have been described, in alternative embodiments, other types of predicates, languages, or symbolic models, may be used to create a signature to thereby codify content desired to be detected. Also, the operations performed by processor 14 and processor 702 can be performed by any combination of hardware and software within the scope of the invention, and should not be limited to particular embodiments comprising a particular definition of "processor". Furthermore, it should be noted that the configuration of detection device should not be limited to the examples shown previously, and that detection device may have other configurations as long as it can perform the functions described herein. For example, in some embodiments, the functions performed by processor 24 and processor 702 may be implemented using a single processor. In addition, protocol differentiator 704, packet processing module 706, stack 708, fire module, and decryption module may be implemented in processor 24, processor 702, or another processor, which may or may not include a memory unit.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed is:

1. A method for detecting network traffic content, the method comprising:
   translating, by a network device, at least one signature codified with at least one predicate representative of at least one function to be performed to detect network traffic content to be detected into a byte stream executable by a processor to determine whether network traffic content matches content to be detected, the at least one signature is received via a first input port of the network device;
   receiving, by the network device via a second input port, network traffic content; and
   processing, by the network device, received network traffic content to determine whether the network traffic content includes the content to be detected as represented in the translated at least one signature.

2. The method of claim 1, further comprising preventing at least a portion of the network traffic content from being sent to a user when the network traffic content matches the content to be detected.

3. The method of claim 1, further comprising sending a message to a user when the network traffic content matches the content to be detected.

4. The method of claim 1, wherein each of the first and the second input ports are externally accessible.

5. The method of claim 1, further comprising:
   categorizing each of the at least one signatures according to the one or more functions prescribed by each of the at least one predicates.

6. The method of claim 1, further comprising storing the at least one signature.

7. The method of claim 1, wherein each of the at least one signatures is codified using at least one predicate.

8. The method of claim 7, wherein each of the at least one predicates is represented in a signature by one or more of a letter, a word, a sentence, a number, a logical operator, and a mathematical operator.

9. The method of claim 1, wherein the network device operates to manage a flow of the network traffic content.

10. The method of claim 9, wherein the network device, in managing the flow of the network traffic content, scans received data to determine a protocol of the network traffic content and performs the processing when the determined protocol of the network traffic content matches a protocol of network traffic content that could contain the content to be detected.

11. A non-transitory computer product includes a computer-readable medium, the computer-readable medium having a set of stored instructions, an execution of which causes a process to be performed, the process comprising:
   translating, by a network device, at least one signature codified with at least one predicate representative of at least one function to be performed to detect network traffic content to be detected into a byte stream executable by a processor to determine whether network traffic content matches content to be detected, the at least one signature is received via a first input port of the network device;
   receiving, by the network device via a second input port, network traffic content; and
   processing, by the network device, received network traffic content to determine whether the network traffic content includes the content to be detected as represented in the translated at least one signature.

12. The non-transitory computer product of claim 11, the process further comprising preventing at least a portion of the network traffic content from being sent to a user when the network traffic content matches the content to be detected.

13. The non-transitory computer product of claim 11, the process further comprising blocking the network traffic content and sending a message to a user when the network traffic content matches the content to be detected.

14. The non-transitory computer product of claim 12, wherein each of the first and the second input ports are externally accessible.

15. The non-transitory computer product of claim 11, the process further comprising categorizing each of the at least one signatures according to the one or more functions prescribed by the at least one of the one or more predicates.

16. The non-transitory computer product of claim 11, the process further comprising storing the translated at least one signature.

17. The non-transitory computer product of claim 11, wherein each of the at least one signatures is codified according one or more predicates.

18. The non-transitory computer product of claim 17, wherein each of the one or more predicates is represented in a signature by one or more of a letter, a word, a sentence, a number, a logical operator, and a mathematical operator.

19. The non-transitory computer product of claim 11, the process further comprising managing a flow of the network traffic content.

20. The non-transitory computer product of claim 19, wherein the managing comprises scanning the data to determine a protocol of the network traffic content, wherein the processing is performed when the determined protocol of the network traffic content matches with a protocol of network traffic content that could contain the content to be detected.

* * * * *